United States Patent [19]

Goldwasser et al.

[11] 4,376,834
[45] Mar. 15, 1983

[54] POLYURETHANE PREPARED BY REACTION OF AN ORGANIC POLYISOCYANATE, A CHAIN EXTENDER AND AN ISOCYANATE-REACTIVE MATERIAL OF M.W. 500-20,000 CHARACTERIZED BY THE USE OF ONLY 2-25 PERCENT BY WEIGHT OF THE LATTER MATERIAL

[75] Inventors: David J. Goldwasser, Cheshire; Kemal Onder, North Haven, both of Conn.

[73] Assignee: The Upjohn Company, Kalamazoo, Mich.

[21] Appl. No.: 311,198

[22] Filed: Oct. 14, 1981

[51] Int. Cl.$^3$ ............................................. C08G 18/14
[52] U.S. Cl. .................................... 521/159; 521/160; 521/173; 521/176; 528/60; 528/65; 528/66; 528/67; 528/76; 528/77; 528/80; 528/81; 528/83
[58] Field of Search ............... 521/159, 160, 173, 176; 528/60, 65, 66, 67, 76, 77, 80, 81, 83

[56] References Cited

U.S. PATENT DOCUMENTS

| | | | |
|---|---|---|---|
| 2,284,637 | 6/1942 | Catlin | 528/85 |
| 2,284,896 | 6/1942 | Hanford et al. | 528/85 |
| 2,511,544 | 6/1950 | Rinke et al. | 528/85 |
| 2,873,266 | 2/1959 | Urs | 528/85 |
| 4,169,196 | 9/1979 | Ehrlich et al. | 528/76 |

OTHER PUBLICATIONS

Otto Bayer: Angewandte Chemie, A59, No. 9, Sep. 1947 at pp. 255-288.

*Primary Examiner*—Maurice J. Welsh
*Attorney, Agent, or Firm*—Denis A. Firth; John Kekich

[57] ABSTRACT

Polyurethane resins are described having high impact strength and other structural strength properties, and significantly improved resistance to deformation by heat. The properties of these materials are such as to make them comparable to engineering thermoplastics such as nylon and like materials commonly used to fabricate structural components such as automotive parts, equipment housing, sporting goods, furniture, toys, household and like consumer goods.

The resins are prepared from organic polyisocyanates, an isocyanate-reactive material (polyol, polyamine, etc.) having an average functionality of at least 1.9, a Tg less than 20° C. and molecular weight of 500-20,000, and one or more low molecular weight extenders the major distinguishing feature being the markedly lower proportion by weight (2 to 25 percent) in which the isocyanate-reactive material is employed as compared with polyurethane resins conventionally prepared in the art. Depending upon the particular combination of reactants employed the polyurethanes of the invention can be thermoplastic or thermoset and can be prepared in both cellular and non-cellular form.

37 Claims, No Drawings

POLYURETHANE PREPARED BY REACTION OF AN ORGANIC POLYISOCYANATE, A CHAIN EXTENDER AND AN ISOCYANATE-REACTIVE MATERIAL OF M.W. 500-20,000 CHARACTERIZED BY THE USE OF ONLY 2-25 PERCENT BY WEIGHT OF THE LATTER MATERIAL

BACKGROUND OF THE INVENTION

1. Field of the Invention

This invention relates to polyurethane resins and is more particularly concerned with polyurethane resins both cellular and non-cellular having improved structural strength properties and with methods for their preparation.

2. Description of the Prior Art

The preparation of polyurethanes, both cellular and non-cellular, by the reaction of organic polyisocyanates, polymeric polyols, and low molecular weight extenders such as glycols, alkanolamines and diamines, is so well-known in the art as not to require detailed description herein.

Polyurethanes hitherto available have been used extensively in the fabrication of a wide variety of components, particularly the thermoplastic polyurethane elastomers which can be fabricated by injection molding or by reaction injection molding (RIM) techniques. However, the use of these materials to prepare components having structural strength properties which match those derived from engineering thermoplastics such as nylon and the like, has been limited by the need to provide extensive reinforcement using materials such as fiberglass in order to achieve desirable levels of stiffness, impact resistance and related properties.

We have now found that polyurethanes with markedly improved structural strength properties can be prepared by departing significantly from the previous teachings of the art as to the relative proportions of reactants to be employed. Thus, we have found that very substantial reduction in the amount by weight of the polymeric active-hydrogen containing material (e.g. polyol) employed in the preparation of the polyurethanes is a major factor in producing a highly surprising and dramatic change in the properties of the resulting polyurethanes. The change in properties is enhanced by selection of particular combinations of reactants as will be discussed in detail below. These changes enable us to produce resins which can be employed, without the necessity to incorporate reinforcing fillers and the like, to produce structural components which possess all the desirable impact resistance, stiffness, and other structural strength properties which have been achievable heretofore by the use of other polymers such as nylon and other engineering thermoplastics but not by polyurethanes alone.

To the best of our belief it has not been recognized that such a result as that described herein could be achieved. Thus it has been well-known since the inception of the polyurethane art that linear polyurethanes could be obtained by reaction of organic diisocyanates with one or more low molecular weight diols and or diamines; see, for example Otto Bayer, Angewandte Chemie, A59, No. 9, at pp. 255-288, September 1947; see also U.S. Pat. Nos. 2,284,637, 2,284,896, 2,511,544 and 2,873,266. Such products have found utility chiefly in the fiber field. It was also recognized early in the history of polyurethane chemistry (see Otto Bayer, supra) that a wide variety of useful products both cellular and non-cellular, could be obtained by reaction of organic polyisocyanates, polymeric polyols and low molecular, di- or polyfunctional active-hydrogen containing compounds such as glycols and the like (usually termed extenders). These products are obtained by the one-shot procedure by reacting all the components together simultaneously or by the prepolymer method which involves prereacting the organic polyisocyanate with a portion or all of the polymeric polyol and then reacting the resulting isocyanate-terminated prepolymer with the low molecular weight extender and any polymeric polyol which was not used in preparing the prepolymer. In general, the above types of product are prepared using a combination of polymeric polyol and low molecular weight extender in which there is at least one equivalent, and more usually several equivalents, of the low molecular weight extender for each equivalent of polymeric polyol. However, since the molecular weight of the polymeric polyol is substantially higher than that of the extender, the proportion by weight of the polymeric polyol used in preparing the polyurethane is substantially in excess of the proportion by weight of the low molecular weight extender.

The relative proportions of the polymeric polyol to the low molecular weight extender used in preparing such polyurethanes greatly influences the properties of the polyurethane which is obtained. Thus the polymer chain units derived from the low molecular weight extender are referred to as "hard segments" since they are relatively rigid, i.e. they exhibit high moduli of elasticity. The polymer chain units derived from the polymeric polyols are referred to as "soft segments" since, because of the presence of the relatively large polyol residues, particularly where the polyol is a linear polymeric diol, they exhibit low moduli of elasticity. In the case, for example, of a relatively linear polyurethane, prepared from a diisocyanate, a polymeric glycol and difunctional extender, increasing the proportion of extender to polymeric polyol gives progressively more rigid polyurethanes and, beyond a certain point, the polymer becomes relatively brittle and shows very low impact resistance when fabricated in the form of structural components.

In further illustration of this point it has generally been conventional, in order to prepare thermoplastic polyurethanes with reasonable levels of impact resistance, to avoid the formation of brittle polymers by maintaining sufficiently high proportions of soft segments (i.e. by using a substantial proportion by weight of polymeric polyol) and to generate a desirable level of stiffness by incorporating reinforcing fillers such as glass fibers into the polymer. However, this leads to additional problems caused by the difficulties of handling such mixtures particularly when the molding operation is being carried out as part of a RIM process.

Accordingly, we believe that it is all the more surprising to find that it is possible to choose certain combinations of organic polyisocyanate, polymeric polyol (or like active-hydrogen containing material) and low molecular extender in which the level of the polymeric polyol (i.e. the level of soft segments in the resulting polyurethane) is reduced to a very low order of magnitude and the level of the extender (i.e. the level of hard segments in the resulting polyurethane) is increased beyond a point at which it would have been expected that the resulting polymer would be too brittle, and to obtain products which are suitable for the fabrication of component parts having satisfactory structural strength including impact resistance.

While the substantially reduced level of polymeric polyol or like active-hydrogen containing material employed in preparing the compositions of the invention is one of the major characteristics of the latter which distinguish them from products hitherto known in the art, it is to be understood that there are additional considerations, to be discussed in detail below, which serve to differentiate these compositions very clearly from the compositions hitherto described in the art which is known to us.

SUMMARY OF THE INVENTION

This invention, in its broadest scope, encompasses polyurethanes characterized by high impact resistance, high flexural modulus, and a heat deflection temperature of at least 50° C. at 264 psi which polyurethanes comprise the product of reaction of (a) an organic polyisocyanate;

(b) an isocyanate-reactive material having an average functionality of at least 1.9, a glass transition temperature (Tg) of less than 20° C., and a molecular weight in the range of about 500 to 20,000; and (c) at least one chain extender having a functionality from 2 to 3 and a molecular weight from about 50 to about 400;

said polyurethanes being further characterized in that the proportion by weight of said component (b) in said polyurethanes is from about 2 to about 25 percent and the overall ratio of isocyanate groups to active hydrogen groups in the reactants employed to prepare said polyurethanes is in the range of 0.95:1 to 1.05:1.

The polyurethanes of the invention can be obtained in both cellular and non-cellular form and, depending upon the nature of the reactants employed as will be discussed hereinafter, the polyurethanes of the invention can be thermoplastic or thermoset.

By the term "high impact resistance" is meant an impact strength at ambient conditions (circa 20° C.) of at least 1 ft. lb. per inch and preferably at least 3 ft. lbs. per inch of notch as measured by the notched Izod test (ASTM D 256-56).

The "heat deflection temperature" is a measure of the resistance of the polymer to deformation by heat and is the temperature (in °C.) at which deformation of a specimen of the polyurethane of predetermined size and shape occurs when subjected to a flexural load of a stated amount (e.g. 264 psi). All such temperatures recorded herein were obtained using the procedure of ASTM D 648-56.

The term "high flexural modulus" means a flexural modulus under ambient conditions (see above) of at least about 150,000 psi as measured by ASTM-D790.

The term "isocyanate-reactive material" means a compound (as hereinafter described and exemplified in detail) which contains groups such as hydroxy, mercapto, and amino which contain active hydrogen atoms and which therefore will enter into reaction with isocyanate groups. The term "average functionality of at least 1.9" means that said material contains an average of at least 1.9 such active hydrogen-containing groups per molecule.

DETAILED DESCRIPTION OF THE INVENTION

The polyurethanes of the invention can be prepared by any of the methods currently employed in the art using the reactants and the proportions set forth above. Preferably the polyurethanes of the invention are made by the one-shot procedure and less preferably by the prepolymer method. In the case of the one-shot procedure, the non-cellular polyurethanes of the invention are made advantageously by preblending the isocyanate-active material (b) [hereinafter referred to as "component (b)" for the sake of convenience] and the extender (c) and feeding these to the reaction mixture as a single component, the other major component being the polyisocyanate. The mixing of the reactants can be accomplished by any of the procedures and apparatus conventional in the art. Preferably, the individual components are rendered substantially free from the presence of extraneous moisture using conventional procedures, for example by heating under reduced pressure at a temperature above the boiling point of water at the pressure employed. The mixing of the reactants can be carried out at ambient temperature (i.e. of the order of 20° to 25° C.) and the resulting mixture is then generally heated to a temperature of the order of about 40° C. to about 130° C. preferably to a temperature of about 50° C. to about 100° C. Advantageously and preferably, one or more of the reactants is preheated to a temperature within the above ranges before the admixing is carried out. Advantageously, in a batch procedure, the heated reaction components, prior to admixture, are subjected to degassing in order to remove entrained bubbles of air or other gases before the reaction takes place. This is accomplished conveniently by reducing the pressure under which the components are maintained until no further evolution of bubbles occurs. The degassed reaction components are then admixed and transferred to suitable molds, extruders, flexible belts and the like and allowed to cure at temperatures of the order of ambient temperature to about 250° C. Pressure may also be applied during the curing reaction. The time required for curing will vary according to the temperature of curing and also with the nature of the particular composition. The time required in any given case can be determined by a process of trial and error.

It is frequently desirable, but not essential, to include a catalyst in the reaction mixture employed to prepare the compositions of the invention. Any of the catalysts conventionally employed in the art to catalyze the reaction of an isocyanate with a reactive hydrogen containing compound can be employed for this purpose. A detailed listing of such catalysts is to be found, for example, in U.S. Pat. No. 4,202,957 at Column 5, lines 45 to 67. This disclosure is incorporated herein specifically by reference. The amount of catalyst employed is generally within the range of about 0.02 to about 2.0 percent by weight based on the total weight of the reactants. In a particular embodiment of the one-shot procedure the reaction is carried out on a continuous basis using apparatus and procedures such as that which is disclosed in U.S. Pat. No. 3,642,964.

When the compositions of the invention are prepared by the less preferred prepolymer method, the polyisocyanate and the component (b) are reacted in a preliminary stage to form an isocyanate-terminated prepolymer or quasi-prepolymer. This reaction is conducted, if desired, in the presence of a catalyst such as those described above. Prior to the reaction, the polyisocyanate and the component (b) are preferably rendered substantially free from the presence of extraneous moisture using the methods described above. The formation of the prepolymer is advantageously carried out at a temperature within the range of about 70° C. to about 130° C. under an inert atmosphere such as nitrogen gas in accordance with conventional procedures. The prepolymer so formed can then be reacted with the extender (c) to form the polyurethanes of the invention. This reaction is carried out advantageously within the range of temperatures specified above for the one-shot procedure. In general, the prepolymer and the extender are mixed and heated within the requisite temperature range while the mixture is degassed as described previously. The degassed mixture is then transferred to a suitable mold, extrusion apparatus or the like and cured as described for the one-shot procedure.

Any of the organic diisocyanates and polyisocyanates previously employed in the preparation of polyurethanes can be employed in preparing the compositions of the invention. Illustrative of such isocyanates are:- methylenebis(phenyl isocyanate) including the 4,4'-isomer, the 2,4'-isomer and mixtures thereof, m- and p-phenylene diisocyanates, chlorophenylene diisocyanates, $\alpha,\alpha'$-xylylene diisocyanate, 2,4- and 2,6-toluene diisocyanate and the mixtures of these latter two isomers which are available commercially, tolidine diisocyanate, hexamethylene diisocyanate, 1,5-naphthalene diisocyanate, isophorone diisocyanate, and methylenebis(cyclohexyl isocyanate) including the 4,4'-isomer, the 2,4'-isomer and mixtures thereof. Preferably the organic polyisocyanate employed in the invention is methylenebis(phenyl isocyanate), in the form of the 4,4'-isomer as well as mixtures of the 4,4'-isomer with amounts (up to about 70 percent by weight) of the 2,4'-isomer, and modified forms of this diisocyanate. By the latter are meant those forms of methylenebis(phenyl isocyanate) which have been treated to render them stable liquids at ambient temperature (circa 20° C.). Such products include those which have been reacted with a minor amount (up to about 0.2 equivalents per equivalent of polyisocyanate) of an aliphatic glycol or a mixture of aliphatic glycols such as the modified methylenebis(phenyl isocyanates) described in U.S. Pat. Nos. 3,394,164; 3,644,457; 3,883,571; 4,031,026; 4,115,429; 4,118,411; and 4,299,347.

The modified methylenebis(phenyl isocyanates) also include those which have been treated so as to convert a minor proportion of the diisocyanate to the corresponding carbodiimide which then interacts with further diisocyanate to form uretone-imine groups, the resulting product being a stable liquid at ambient temperatures as described, for example, in U.S. Pat. No. 3,384,653. Mixtures of any of the above-named polyisocyanates can be employed if desired. Further, in the case of the preparation of those polyurethanes of the invention which are thermoset, it is possible to introduce into the polyisocyanate component employed in the reaction minor amounts (up to about 30 percent by weight) of polymethylene polyphenyl polyisocyanates. The latter are mixtures containing from about 20 to 90 percent by weight of methylenebis(phenyl isocyanate) the remainder of the mixture being polymethylene polyphenyl polyisocyanates of functionality higher than 2.0. Such polyisocyanates and methods for their preparation are well-known in the art; see, for example, U.S. Pat. Nos. 2,683,730; 2,950,263; 3,012,008 and 3,097,191. These polyisocyanates are also available in various modified forms. One such form comprises a polymethylene polyphenyl polyisocyanate as above which has been subjected to heat treatment, generally at temperatures from about 150° C. to about 300° C., until the viscosity (at 25° C.) has been increased to a value within the range of about 800 to 1500 centipoises. Another modified polymethylene polyphenyl polyisocyanate is one which has been treated with minor amounts of an epoxide to reduce the acidity thereof in accordance with U.S. Pat. Nos. 3,793,362.

The isocyanate-reactive materials ["component (b)"] employed in the preparation of the polyurethanes of the invention can be any of those previously known in the art and employed in the preparation of polyurethanes which materials contain active hydrogen groups and which also meet the criteria set forth above, namely, have a functionality of at least 1.9, a glass transition temperature (Tg) of less than 20° C., and a molecular weight in the range of about 500 to about 20,000. The glass transition temperature is a well-recognized property; see, for example, Encyclopedia of Polymer Science and Technology, Vol. 3, p. 620, Interscience Publishers, New York, 1965. The method employed to determine the Tg of any material can take a number of forms; the particular method employed to determine Tg for starting materials and polymers produced in accordance with the present invention is that described in Example 2 hereafter.

As set forth above the proportion of isocyanate-reactive material employed in the compositions of the invention can be within the range of about 2 to 25 percent by weight. Preferably the proportion is in the range of 4 to 15 percent by weight and most preferably is in the range of 4 to 10 percent by weight.

Exemplary of isocyanate-reactive materials which can be employed in the preparation of the polymers of the invention are: polyether polyols, polyester polyols, amine-terminated polyethers, hydroxy-terminated polycarbonates, hydroxy-terminated polybutadienes, hydroxy-terminated polybutadiene-acrylonitrile copolymers, amino-terminated polybutadiene-acrylonitrile copolymers, hydroxy-terminated copolymers of dialkyl siloxane and alkylene oxides such as ethylene oxide, propylene oxide and the like, provided that all of said compounds also meet the criteria of Tg, molecular weight and functionality listed above. Preferably the molecular weights of the materials are within the range of about 1250 to about 10,000 and, most preferably, in the range of about 2000 to about 8000. The functionality of these materials is advantageously not greater than about 6 and, preferably, the functionality is in the range of about 2 to 4.

Illustrative of polyether polyols are polyoxyethylene glycols, polyoxypropylene glycols which, optionally, have been capped with ethylene oxide residues, random and block copolymers of ethylene oxide and propylene oxide, propoxylated tri- and tetrahydric alcohols such as glycerine, trimethylolpropane, pentaerythritol, and the like, which propoxylated compounds have been capped with ethylene oxide; polytetramethylene glycol, random and block copolymers of tetrahydrofuran and ethylene oxide and or propylene oxide, and products derived from any of the above by reaction with di- or higher functional carboxylic acids or esters derived from said acids in which latter case ester interchange occurs and the esterifying radicals are replaced by polyether polyol radicals. Advantageously, the polyether polyols employed as component (b) in the polyurethanes of the invention have a primary hydroxyl group content of at least 80 percent. The preferred polyether polyols are random and block copolymers of ethylene and propylene oxide of functionality approximately 3.0 and polytetramethylene glycol polymers of functionality greater than or equal to 2.0.

In a particular embodiment of the invention the component (b) which is employed can be a polyol obtained by reacting any of the above polyether polyols with a di- or trifunctional aliphatic or aromatic carboxylic acid to form the corresponding polyether-esters. Examples of acids which can be used are adipic, azelaic, glutaric, isophthalic, terephthalic, trimellitic and the like.

The polyether polyols which can be employed as component (b) also include the vinyl reinforced polyether polyols, e.g. those obtained by the polymerization of styrene and or acrylonitrile in the presence of the polyether.

Illustrative of polyester polyols are those prepared by polymerizing ε-caprolactone using an initiator such as ethylene glycol, ethanolamine and the like, and those prepared by esterification of polycarboxylic acids such as phthalic, terephthalic, succinic, glutaric, adipic, azelaic and the like acids with polyhydric alcohols such as ethylene glycol, butanediol, glycerol, trimethylolpropane, 1,2,6-hexanetriol, cyclohexanedimethanol and the like. A preferred group of polyesters are those obtained by esterifying a dimeric or trimeric fatty acid, optionally mixed with a monomeric fatty acid, such as oleic acid, with a relatively long chain aliphatic diol such as hexane-1,6-diol and the like.

Illustrative of the amine-terminated polyethers are the aliphatic primary di- and tri-amines structurally derived from polyoxypropylene glycols and triols and having structures represented by

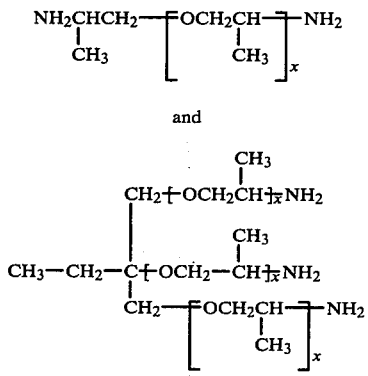

and

Polyether diamines of this type are available from Jefferson Chemical Company under the trademark JEFFAMINE.

Illustrative of polycarbonates containing hydroxyl groups are those prepared by reaction of diols such as propane-1,3-diol, butane-1,4-diol, hexan-1,6-diol, diethylene glycol, triethylene glycol, dipropylene glycol and the like with diarylcarbonates such as diphenylcarbonate or with phosgene.

Illustrative of the silicon-containing polyethers are the copolymers of alkylene oxides with dialkylsiloxanes such as dimethylsiloxane and the like; see, for example, U.S. Pat. No. 4,057,595.

Illustrative of the hydroxy-terminated poly-butadiene copolymers are the compounds available under the trade name Poly BD Liquid Resins from Arco Chemical Company. Illustrative of the hydroxy- and amine-terminated butadiene/acrylonitrile copolymers are the materials available under the trade name HYCAR hydroxyl-terminated (HT) Liquid Polymers and amine-terminated (AT) Liquid Polymers, respectively.

The extenders which are used in preparing the compositions of the invention are inclusive of aliphatic straight and branched chain diols, including cyclo aliphatic diols, preferably having from about 2 to 8 carbon atoms, inclusive, in the chain. Illustrative of such diols are ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, 1,4-cyclohexanediamethanol, and the like including mixtures of two or more such diols. The extenders, which can be used alone or in admixture with each other or any of the above diols, also include diethylene glycol, dipropylene glycol, tripropylene glycol, ethanolamine, N-methyldiethanol-amine, N-ethyl-diethanolamine, and the like, as well as ester diols obtained by esterifying adipic, azelaic, glutaric and like aliphatic dicarboxylic acids with aliphatic diols such as those exemplified above utilizing from about 0.01 to about 0.8 mole of acid per mole of diol. Also included in the extenders which can be used in preparing the polyurethanes of the invention are the adducts obtained by an aliphatic diol or triol such as 1,4-cyclohexanedimethanol, neopentyl glycol, hexane-1,2-diol, ethylene glycol, butane-1,4-diol, trimethylolpropane and the like with ε-caprolactone in a mole ratio of from 0.01 to 2 moles of caprolactone per mole of diol or triol. Trifunctional extenders such as glycerol, trimethylolpropane and the like can also be employed alone or in admixture with one or more of the above diols in the preparation of thermoset polymers according to the invention.

The compositions of the invention include both thermoplastic and thermoset resins. The thermoplastic resins are obtained by employing substantially difunctional polyisocyanates and difunctional extenders and a component (b) having a functionality preferably not exceeding about 4, although polyols having higher functionalities can be employed where the weight proportion employed is in the lower level of the ranges set forth above. Since the amount by weight of the component (b) employed in the compositions of the invention is relatively small, it is possible to employ such components having functionalities greater than two without detracting from the thermoplasticity of the resulting product. However, there is a limit on the degree to which the functionality of the component (b) can be increased without losing the thermoplastic properties in the resulting product. As will be recognized by one skilled in the art, this limit will vary according to the nature of the component (b), its molecular weight, and the amount in which it is used within the ranges set forth above. In general, the higher the molecular weight of the component (b) the higher the functionality which can be employed without losing the thermoplastic properties in the polyurethane product.

Further, although in general it is desirable to employ a substantially pure diisocyanate, i.e. polyisocyanate free from isocyanates of functionality greater than 2.0, in order to prepare the thermoplastic compositions of the invention, it is found that certain modified methylenebis(phenyl isocyanates) can be employed without detracting from the desired properties. In particular, it is found that a methylenebis(phenyl isocyanate) which has been converted to a stable liquid as described above by reaction with a minor amount of one or more glycols of low molecular weight can give the desired thermoplastic properties in combination with the difunctional extender as described above. In addition, methylenebis(phenyl isocyanate) can be used in admixture with minor proportions, up to about 25 percent by weight, of other modified liquid methylenebis(phenyl isocyanates) such as those described above in which a portion of the diisocyanate has been converted to carbodiimide. However, in general it is not possible to utilize the latter type of isocyanate itself without the admixture with major proportions of methylenebis(phenyl isocyanate) and still obtain thermoplastic polyurethanes.

While any of the diol extenders described and exemplified above can be employed in preparing the thermoplastic compositions of the invention, alone, or in admixture, it is preferred to use 1,4-butanediol, neopentyl glycol, 1,4-cyclohexanedimethanol, ethylene glycol, and diethylene glycol either alone or in admixture with each other or with one or more aliphatic diols previously named. A particularly preferred diol for the preparation of thermoplastic products is 1,6-hexanediol either as the sole extender or in combination with one or more of the above-named group.

In addition to being characterized by the substantially reduced amount of component (b) which is employed in accordance with the invention, the polyurethanes of the invention are characterized by very specific properties which are believed to be evidence of the existence of a two-phase morphology in the compositions. In particular, it is believed that the soft segment of the polymer, which is the minor segment by weight, exists in a separate phase which is dispersed throughout the hard segment which forms the other phase of the polymer. Some evidence of this is apparent from visual inspection since polymers which are prepared in accordance with the invention, and which are characterized by the higher impact resistance, high flexural modulus and the minimum heat deflection temperature set forth above, are opaque in appearance presumably due to differing refractive indices of the two phases. This is in direct contrast to polyurethanes prepared substantially in accordance with the invention, but replacing the component (b) by a different material not within the above definition and or by using a combination of extenders or isocyanates which is outside the limits discussed above. In such cases the resulting polymer is found to be clear in appearance, i.e. transparent, and is devoid of the high impact resistance and other properties discussed above.

More quantitative evidence of the existence of the two-phase structure discussed above is found from studies of the dynamic mechanical spectroscopy of the polymers of the invention. Such studies are well-known in the art (see, for example, I. M. Ward, Mechanical Properties of Solid Polymers, Wiley-Interscience, New York, 1971 at p. 138 et seq.). Generally they involve measurement of the change of stiffness and loss factor ("tan $\delta$") in tension, shear, or flexure as a function of temperature or frequency. A homopolymer generally exhibits a single primary damping peak in a plot of tan $\delta$ versus temperature or frequency, which peak is associated with its glass transition whereas a two phase system shows two such damping peaks.

It is found that, using this method of determination, the plots of tan $\delta$ versus temperature obtained in the case of the compositions of this invention show two well-defined and well separated primary damping peaks which correspond to the glass transition temperatures of the component (b) on the one hand and the hard segment on the other. This clearly suggests that the compositions of the invention do exhibit the above-described two-phase morphology consisting of a dispersion of a component (b) rich phase in a hard urethane matrix. The glass transition temperature of the component (b) rich phase usually occurs below room temperature, while that of the urethane glass phase occurs at approximately 100° C.

It is to be understood that the above discussion of the morphology of the polyurethanes of the invention is offered by way of explanation and is not intended to be in any way limiting as to the scope of the present invention. The latter is defined solely by the claims which are appended to this specification.

In some of the compositions prepared in accordance with the invention using polyether polyols as the component (b) it is found that, unless careful control is exercised in maintaining molding temperatures of the polymer within certain ranges which will be discussed further below, there is a tendency for parts molded from some of the compositions to delaminate. Some compositions may outgas during molding unless careful control of processing temperatures is maintained. It is found, in a particular embodiment of the invention, that these tendencies can be greatly reduced by introducing into the components used to prepare the compositions a minor amount of a polyester polyol. The latter, which can be any of those described and exemplified above as useful in its own right as component (b), is believed to render the two phases more compatible, one with the other and to minimize outgassing by lowering processing temperatures.

When a polyester is employed in the above manner, the combined amount of polyether and polyester polyol used still falls in the range of 2 to 25% w/w based on total polymer set forth above for the polyether polyol alone. The preferred and most preferred amounts given earlier for the polyether polyol alone also apply to the total polyol when polyester polyol is present.

Those compositions of the invention which are thermoset are obtained by any of the various methods described above but employing a combination of reactants, within the parameters set forth above, which results in the introduction of a significant degree of crosslinking in the polymer. This can be achieved by utilizing (a) an organic polyisocyanate which has a functionality significantly higher than 2, e.g. methylenebis(phenyl isocyanate) which has been partially converted to carbodiimide and which thereby contains a proportion of uretone-dione or (b) by utilizing a trifunctional or higher functional extender alone or in combination with difunctional extenders or (c) by utilizing a component (b) having functionality in the higher end of the range set forth above, i.e. in the range of up to 6 or (d) by using a combination of any of the above.

The borderline between the formation of thermoset rather than thermoplastic materials may vary depending on the particular combination of reactants. In any given instance the combination of reactants required to obtain a thermoset polyurethane on the one hand or a thermoplastic polyurethane on the other hand can readily be determined by a process of trial and error.

The compositions of the invention can also incorporate various additives such as fillers, antioxidants, pigments, fire retardants, plasticizers, reinforcing agents and the like commonly employed in the art in such compositions.

The compositions of the invention can be obtained in both cellular and non-cellular form. The cellular compositions of the invention can be prepared by methods well recognized in the art. For example, a blowing agent can be incorporated in the reaction mixture employed in the preparation of the compounds described above. Preferably, the blowing agent is a volatile organic liquid which is vaporized during the exothermic reaction which takes place in forming the compositions of the invention but, in the case of those compositions which are thermoset, it is also possible to use water as the blowing agent. The reaction of the water with polyisocyanate utilized in the reaction mixture generates carbon dioxide which acts as the blowing agent. Examples of organic liquids which can be used as blowing agents are inert liquids, i.e. liquids which do not react chemically with any of the components of the reaction mixture and which do not interfere in any way with the desired course of the reaction, having boiling points in the range of about −20° C. to about 110° C. Illustrative of such liquids are butane, hexane, heptane, methylene chloride, chloroform, monofluorotrichloromethane, chlorodifluoromethane, dichlorodifluoromethane and the like.

In the case of the thermoplastic compositions of the invention which may be prepared and isolated in flake, pellet or like form and then be subsequently molded by injection molding and like techniques, it is also possible to prepare cellular compositions therefrom by blowing with inert gases such as nitrogen, air, carbon dioxide and the like during the final molding process using techniques well-known in the art for thermoplastic materials such as nylon, polycarbonate, polystyrene, polyethylene and the like.

The compositions of the invention can be fabricated in any desired configuration for use as automobile body parts, equipment housings, mechanical goods, gears, gaskets and a wide variety of other such articles which require the high impact resistance and other properties possessed by the polyurethanes of the invention. The methods of fabrication can be any of those known in the art of molding thermoplastic or thermoset polyurethanes. Such methods include reaction injection molding, cast molding in the case of thermosets and injection molding, extrusion, blow molding, calendering, thermoforming and the like in the case of thermoplastics. The marked resistance of the polyurethanes of the invention to deformation or decomposition upon exposure to temperatures involved in melt processing greatly facilitates the fabrication of articles from the thermoplastic compositions of the invention.

It has also been found that, in the case of many compositions of the invention, exposure of the compositions to moisture at elevated temperatures of the order of 100° F. or higher for limited periods of time can result in significant increase in impact resistance over and above the high value of impact resistance possessed by the material before exposure to moisture and heat. Accordingly, subjecting the fabricated compositions of the invention to curing by exposure to moist air at ambient temperature or elevated temperatures is a valuable final step in the manufacture of articles in which high impact strength is particularly desirable.

The following examples describe the manner and process of making and using the invention and set forth the best mode contemplated by the inventors of carrying out the invention but are not to be construed as limiting.

EXAMPLE 1

A polyurethane in accordance with the invention was prepared in the following manner. A mixture of 38 g. (0.0175 equiv.) of SF-6503 (polyoxyethylene polyoxypropylenetriol; mol. wt.=6500; Texaco Chemical), 43.2 g. (0.96 equiv.) of 1,4-butanediol, 12.48 g. (0.24 equiv.) of neopentyl glycol and 1 drop (0.05 g.) of surfactant (Armul 22; predominantly anionic emulsifier; Arjay Inc.) was prepared by blending the various ingredients. The blend was heated at 80°–100° C. under vacuum (2–30 mm. of mercury) for about 2 hours to remove water and to degas the mixture. The resulting mixture, after allowing to cool to 40° to 60° C., was then admixed with 152 g. (1.22 equivs.) of molten 4,4'-methylenebis(phenyl isocyanate) and 1 drop (0.05 g.) of stannous octoate (50% solution in dioctyl phthalate) and 0.4 g. of antioxidant (Irganox 1010: Ciba-Geigy) were added. The mixture so obtained was immediately subjected to vigorous mechanical stirring for approximately 10 seconds before being poured into a mold (5.5"×6.5"×0.125") preheated to 150°–165° C. The mold was closed, a pressure of 800–1200 psi was applied and maintained thereat for 5 minutes with the temperature of the mold maintained in the stated range. The resulting molded sheet was opaque in appearance and remained so even after postcuring at 100° C. for 1 hour. The cured sheet was subjected to testing for physical properties. The latter are set forth below.

| | |
|---|---|
| [1]Notched Izod Impact: ⅛": fl lbs/in: | 19.6 |
| [2]Flexural Strength: psi × 10³: | 9.9 |
| [2]Flexural Modulus: psi × 10³: | 177 |
| [3]Heat Deflection temp. at 264 psi: °C.: | 85 |
| [4]Tensile strength: psi × 10³: | 5.2 |
| [4]Tensile modulus: psi × 10³: | 127 |
| [4]Elongation at break: %: | 70 |

Footnotes:
[1]ASTM D256-56
[2]ASTM D790
[3]ASTM D648
[4]ASTM D638-68

The percentage by weight of the polyether triol (SF-6503) in the above polyurethane was 15.5. The NCO-/OH index (i.e. the ratio of isocyanate equivalents to total equivalents of hydroxyl groups) was 1.00.

EXAMPLE 2

Using the procedure described in Example 1 a molded sheet of polyurethane was prepared from the following ingredients.

| | Pts. by wt. | Equivs. |
|---|---|---|
| [1]Liquid 4,4'-methylenebis(phenyl isocyanate): (Eq. wt. = 143) | 200 | 1.40 |
| Ethylene glycol: | 21.67 | 0.70 |
| Diethylene glycol: | 37.06 | 0.70 |
| Polyether triol (SF-6503): | 50 | 0.023 |
| Dibutyl tin dilaurate: | 0.1 g | — |

Footnote:
[1]Prepared as described in U.S. Pat. No. 3,384,653

The NCO/OH index was 0.99:1.

The percentage by weight of polyether triol in the final product was 16.2. The properties of the opaque sample of polyurethane so obtained, after curing as described in Example 1, were determined as follows. The glass transition temperature (Tg) was determined by differential scanning calorimetry using a DuPont Model 990 Controller and Model 910 DSC with a scan rate of 10° C./minute and sample size of 20 mg.

| Notched Izod Impact: ft lbs/in | |
|---|---|
| 1/8": | 15.8 |
| 1/4": | 12 |
| Flexural strength: psi × 10³ | 10.4 |
| Flexural modulus: psi × 10³ | 205 |
| Heat deflection temp. at 264 psi: °C. | 93 |
| Glass transition temp.: °C. | 120 |
| Tensile strength: psi × 10³ | 5.6 |
| Tensile modulus: psi × 10³ | 138 |
| Elongation at break: % | 120 |

EXAMPLE 3

Using exactly the procedure and reactants (in the proportions stated) employed in Example 2 with the sole exception that the diisocyanate there used was replaced by an equivalent amount of one of four different isocyanate compositions, there were prepared molded samples of four thermoset polyurethanes. Each sample was cured and subjected to physical testing using the procedures described in Example 1. The details of the isocyanate compositions employed and the physical properties determined on the four samples (all of which were opaque in appearance) are set forth below. The NCO/OH index in all cases was 0.99:1.0. The percentage by weight of polyether triol in the final samples is shown in the following.

| | A[1] | B[2] | C[3] | D[4] |
|---|---|---|---|---|
| Polyisocyanate | | | | |
| % w/w Polyether triol | 16.2 | 16.2 | 16.2 | 16.9 |
| Notched Izod Impact | | | | |
| (1/4"): ft lbs/in | 11.4 | 9.0 | 6.63 | 13.4 |
| Heat Deflection Temp. | | | | |
| °C. | 93 | 89 | 98 | 85 |
| Tensile strength: | | | | |
| psi × 10³ | 6.3 | 5.4 | 5.0 | 5.1 |
| Tensile modulus: | | | | |
| psi × 10³ | 106 | 96.4 | 94 | 118 |
| Elongation at break: % | 110 | 60 | 50 | 120 |

Footnotes:
[1]Blend of 95 parts by weight of the liquid isocyanate of Example 2 and 5 parts by weight of polymethylene polyphenyl polyisocyanate (eq. wt. = 133: average functionality 2.3).
[2]Blend corresponding to footnote 1 but increasing the polymethylene polyphenyl polyisocyanate to 10 parts by weight and reducing the liquid isocyanate to 90 parts by weight.
[3]Blend corresponding to footnote 1 but increasing the polymethylene polyphenyl polyisocyanate to 20 parts by weight and reducing the liquid isocyanate to 80 parts by weight.
[4]Liquid isocyanate (Eq. wt. = 184) obtained by reacting 4,4'-methylenebis(phenyl isocyanate) with low mol. wt. glycols (minor amount).

EXAMPLE 4

Using exactly the procedure and reactants described in Example 2 but increasing the amount of ethylene glycol to 34.62 parts by weight (1.12 equivs.), decreasing the amount of diethylene glycol to 14.82 parts by weight (0.28 equivs.) and increasing the amount of polyether triol to 50 parts by weight (0.023 equivs.), there was obtained an opaque polyurethane molded sample which, after molding at 178° C. for about 5 minutes at 900 psi, and postbaking at 100° C. for about one hour was found to have the following properties:

| Notched Izod Impact 1/4": ft lbs/in: | 12.6 |
|---|---|
| Flexural strength: psi × 10³: | 9.7 |

| -continued | |
|---|---|
| Flexural modulus: psi × 10³: | 195 |
| Heat deflection temp. at 264 psi: °C.: | 97 |
| Tensile strength: psi × 10³: | 6.0 |
| Tensile modulus: psi × 10³: | 119 |
| Elongation: %: | 80 |

The percentage by weight of polyether triol in the above polyurethane was 16.7.

EXAMPLE 5

Using exactly the procedure and reactants described in Example 1 but increasing the amount of neopentyl glycol to 20.8 parts by weight (0.40 equivs.) and decreasing the amount of 1,4-butanediol to 36.02 parts by weight (0.80 equivs.), there was obtained an opaque polyurethane molded sample which after molding at 150°–165° C. and 800–1200 psi for about 5 minutes and postbaking for one hour at 100° C., was found to have the following properties:

| Notched Izod Impact 1/4": ft lbs/in: | 20.6 |
|---|---|
| Flexural strength: psi × 10³: | 9.8 |
| Flexural modulus: psi × 10³: | 176 |
| Heat deflection temp. at 264 psi: °C.: | 80 |
| Tensile strength: psi × 10³: | 5.5 |
| Tensile modulus: psi × 10³: | 105 |
| Elongation: %: | 81 |

The percentage by weight of polyether triol in the above polyurethane was 15.4

EXAMPLE 6

A series of thermoplastic polyurethanes was prepared from 4,4'-methylenebis(phenyl isocyanate) and different combinations of glycol extenders and polyether polyols (details of which are given below) using the following general procedure.

The glycol extender(s) and polyether polyol were blended and dried and degassed by heating under vacuum (2–30 mm. of mercury) for about 2 hours at 80°–100° C. The resulting mixture, without cooling, was admixed quickly with the molten diisocyanate, 1 drop (0.05 g.) of stannous octoate (50% solution in dioctyl phthalate) was added and the mixture was vigorously stirred by mechanical stirrer or by hand for 5–30 seconds before being poured into a Teflon-lined open tray at room temperature. The mixture solidified and was then chopped mechanically into small pieces and dried in a dehumidifying drier. Polyurethane sheets were then molded by injection molding using barrel temperatures of 410°–470° F., mold temperatures of 80°–150° F.; total cycle times ranged from 30–60 seconds. The test samples used for the tensile and flexure tests were prepared using an Arburg press 221E/150 and the sheets used for the remainder of the tests were prepared on a Modern Plastics Machinery SKM75 press. The operating conditions for both apparatus were within the limits given above.

The various polyurethanes so obtained were opaque in appearance after molding. The physical properties of the samples are recorded in the following Table I together with the identity of extenders and polyols used in each case, the proportions, in equivalents per equivalent of diisocyanate, in which the extenders were used and the proportion, in terms of weight percent based on finished polyurethane, in which the polyol was employed. It will be seen that all the samples showed excellent impact resistance as measured by the Notched Izod test, and that the tensile and flexural strength properties were also eminently satisfactory for materials to be employed as engineering plastics.

The following abbreviations are used in TABLE I.

---
BD = 1,4-butanediol
DPG = dipropylene glycol
NPG = neopentyl glycol
PEHQ = p,p'-di(2-hydroxyethyl)hydroquinone
CHDM = 1,4-cyclohexanedimethanol
HD = 1,6-hexanediol
TPG = tripropylene glycol
TEG = triethylene glycol
N.T. = not tested
HDT = Heat deflection temperature
Tg = Glass transition temperature
Identity of polyols in TABLE I:
T-2000 = polytetramethylene glycol: mol. wt = 2000: DuPont.
SF-6503 = see Example 1.
T-1340 = polytetramethylene glycol: mol. wt. = 1340: DuPont.
T-1500 = polytetramethylene glycol: mol. wt. = 1500: DuPont.
55-37 = polyoxyethylene polyoxypropylene glycol: mol. wt. = 4000: Olin.
Identity of extenders in Runs 6-16, 6-17 and 6-18:
Diol A: Ester diol eq. wt. = 123.5 obtained by esterifying adipic acid with CHDM.
Diol B: Ester diol eq. wt. = 119.5 obtained by ester interchange between CHDM and dimethyl azelate.
Diol C: Ester diol eq. wt. = 146 obtained by ester interchange between CHDM and dimethyl azelate.
--- described in Example 6 to give sheets for physical testing. The various polyurethanes so obtained were opaque in appearance and retained their opaqueness throughout the molding process. The following TABLE II gives details of the extenders and polyols used [the diisocyanate was 4,4'-methylenebis(phenyl isocyanate) in all cases] together with the proportions, in equivalents per equivalent of diisocyanate, in which the extenders were used and the proportion, in terms of weight percent based on finished polyurethane, in which the polyol was employed. It will be seen that all the samples showed excellent impact resistance as measured by the Notched Izod test, and that the tensile and flexural strength properties were also eminently satisfactory for materials to be employed as engineering plastics.

The abbreviations used in TABLE II are the same as those used in TABLE I. The identity of the polyols, other than those previously described, used in TABLE II is as follows:

---
NIAX 11-27: polyoxyethylene-polyoxypropylene glycol: Mol. wt. = 6000: Union Carbide
MDS 0509: polyoxyethylene polyoxypropylene glycol: Mol. wt. = 4200: Texaco Chemical
4480-22: polyoxyethylene polyoxypropylene glycol: Mol. wt. = 3700: Witco Chemical Company
LHT 28: polyoxypropylene triol: Mol. wt. = 6000: Union Carbide
T-1000 "triol": Ether ester triol eq. wt. = 1010 obtained by esterification of trimellitic anhydride with T-1000 in xylene solution followed by removal of xylene.
---

TABLE I

| Run No. | Extenders (equivs.) | NCO/OH Index | Polyol: % wt. | Notched Izod Impact (¼": ft lbs/in) | Flexural Strength psi × 10³ | Flexural Modulus psi × 10³ | HDT °C. at 264 psi | Tg °C. | Tensile Strength psi × 10³ | Tensile Modulus psi × 10³ | Elongation at break % |
|---|---|---|---|---|---|---|---|---|---|---|---|
| 6-1 | BD:0.96 | 1.02 | T-2000:8.4 | 24.9 | 14.3 | 335 | 96 | N.T. | N.T. | N.T. | N.T. |
| 6-2 | BD:0.79; DPG:0.2 | 1.01 | SF6503:15.2 | 17.4 | 9.6 | 217 | 77 | 105 | 7.1 | 196 | 160 |
| 6-3 | BD:0.79; NPG:0.2 | 1.01 | SF6503:15.5 | 16.5 | 8.6 | 207 | 89 | 114 | 6.4 | 234 | 80 |
| 6-4 | BD:0.86; NPG:0.1 | 1.02 | SF6503:6 | 18.5 | 14.9 | 330 | 91 | 108 | N.T. | N.T. | N.T. |
| 6-5 | BD:0.8; PEHQ:0.2 | 1.02 | T-1340:15 | 22.8 | 12.8 | 317 | 72 | N.T. | N.T. | N.T. | N.T. |
| 6-6 | BD:0.86; CHDM:0.1 | 1.02 | SF6503:2.9 / T-2000:3.9 } = 6.8 | 18.5 | 12.2 | 257 | 85 | 108 | N.T. | N.T. | N.T. |
| 6.7 | BD:0.78; HD:0.19 | 1.02 | SF6503:6 | 20.9 | 13.6 | 320 | 90 | N.T. | N.T. | N.T. | N.T. |
| 6-8 | BD:0.85; TPG:0.095 | 1.02 | T-1500:12 | 16.2 | 12.9 | 315 | 72 | 86 | N.T. | N.T. | N.T. |
| 6-9 | BD:0.87; TEG:0.11 | 1.02 | T-2000:10 | 2.06 | 13.7 | 317 | 71 | N.T. | N.T. | N.T. | N.T. |
| 6-10 | BD:0.49; NPG:0.49 | 1.01 | SF6503:15.3 | 6.0 | 10.1 | 249 | 91 | N.T. | 6.7 | 210 | 50 |
| 6-11 | BD:0.72; NPG:0.24 | 1.02 | 55-37:15.5 | 17.6 | 10.7 | 242 | 82 | 114 | N.T. | N.T. | N.T. |
| 6-12 | CHDM:0.97 | 1.02 | SF6503:10 | 12.2 | 13.1 | 269 | 111 | 144 | N.T. | N.T. | N.T. |
| 6-13 | CHDM:0.73; HD:0.24 | 1.02 | SF6503:10 | 18.9 | 12.8 | 289 | 97 | 125 | N.T. | N.T. | N.T. |
| 6-14 | HD:0.975 | 1.02 | SF6503:6 | 24.4 | 12.9 | 303 | 84 | 95 | N.T. | N.T. | N.T. |
| 6-15 | HD:0.53; CHDM:0.44 | 1.02 | SF6503:6 | 20.6 | 13.7 | 312 | 78 | 117 | N.T. | N.T. | N.T. |
| 6-16 | Diol A:0.975 | 1.02 | SF6503:6 | 16.2 | 12.4 | 289 | 84 | 114 | N.T. | N.T. | N.T. |
| 6-17 | Diol B:0.975 | 1.02 | SF6503:6 | 23 | 12.3 | 291 | 84 | 109 | N.T. | N.T. | N.T. |
| 6-18 | Diol C:0.945 | 0.985 | SF6503:6 | 2.8 | 12.6 | 297 | 82 | 99 | N.T. | N.T. | N.T. |

EXAMPLE 7

Using the procedure described in Example 6 there was prepared a series of thermoplastic polyurethanes, samples of each of which were injection molded as

TABLE II

| Run No. | Extenders (equivs.) | NCO/OH Index | Polyol: % wt. | Notched Izod Impact (¼": ft lbs/in) | Flexural Strength psi × 10³ | Flexural Modulus psi × 10³ | HDT °C. at 264 psi | Tg °C. | Tensile Strength psi × 10³ | Tensile Modulus psi × 10³ | Elongation at break % |
|---|---|---|---|---|---|---|---|---|---|---|---|
| 7-1 | HD:0.97 | 1.02 | 11-27: 6 | 23.8 | 12.5 | 299 | N.T. | 91 | N.T. | N.T. | N.T. |
| 7-2 | HD:0.96 | 1.02 | T-1000 triol: 6 | 23.69 | 12.4 | 305 | N.T. | N.T. | N.T. | N.T. | N.T. |
| 7-3 | BD:0.79; NPG:0.2 | 1.02 | 55-37: 15.6 | 17 | 10.6 | 236 | 81 | 114 | N.T. | N.T. | N.T. |
| 7-4 | BD:0.79; NPG:0.2 | 1.02 | MDS 0509: 15.5 | 1.5 | 13 | 320 | 80 | N.T. | 8.1 | 301 | 156 |
| 7-5 | BD:0.79; NPG:0.2 | 1.02 | 4480-22: 15 | 18.7 | 13 | 200 | 80 | 112 | N.T. | N.T. | N.T. |

TABLE II-continued

| Run No. | Extenders (equivs.) | NCO/OH Index | Polyol: % wt. | | Notched Izod Impact (⅛": ft lbs/in) | Flexural Strength psi × 10³ | Flexural Modulus psi × 10³ | HDT °C. at 264 psi | Tg °C. | Tensile Strength psi × 10³ | Tensile Modulus psi × 10³ | Elongation at break % |
|---|---|---|---|---|---|---|---|---|---|---|---|---|
| 7-6 | HD:0.97 | 1.02 | LHT 28: | 6 | 14.6 | 12.0 | 290 | 80 | N.T. | N.T. | N.T. | N.T. |

EXAMPLE 8

Using the procedure described in Example 6 there was prepared a series of thermoplastic urethanes using mixtures of two different polymeric polyols and only a single extender. Samples of each of the polyurethanes were injection molded and cured as described in Example 6 to give sheets for physical testing. The various polyurethanes so obtained were opaque in appearance and retained their opaqueness throughout the molding process. The following TABLE III gives details of the extenders and polyols used [the diisocyanate was 4,4'-methylenebis(phenyl isocyanate) in all cases] together with the proportions, in equivalents per equivalent of diisocyanate, in which the extenders were used and the proportion, in terms of weight percent based on finished polyurethane, in which the polyols were used. It will be seen that all the samples showed good impact resistance as measured by the Notched Izod test, and that the tensile and flexural strength properties were also eminently satisfactory for materials to be employed as engineering plastics.

The abbreviations used in TABLE III are the same as those used in TABLE I. The identity of the polyols, other than those described previously, used in TABLE III is as follows:

E 2105: polyoxyethylene polyoxypropylene glycol:
 Mol. wt. = 2000: Texaco Chemical
PCP 2000: polycaprolactonediol: Mol. wt. = 2000: Union Carbide
S102-55: poly(butylene adipate): Mol. wt. = 2000: Ruco
S102-135: poly(butylene adipate): Mol. wt. = 830: Ruco

TABLE III

| Run No. | Extenders (equivs.) | NCO/OH Index | Polyols: % wt. | Notched Izod Impact (⅛": ft lbs/in) | Flexural Strength psi × 10³ | Flexural Modulus psi × 10³ | HDT °C. at 264 psi | Tg °C. |
|---|---|---|---|---|---|---|---|---|
| 8-1 | BD:0.94 | 1.02 | T-2000: 15, E 2105: 10 } 25 | 18.2 | N.T. | 301 | 75 | 78 |
| 8-2 | BD:0.94 | 1.02 | T-2000: 12, E 2105: 8 } 20 | 17 | 11.6 | 297 | 70 | 84 |
| 8-3 | BD:0.94 | 1.02 | T-2000: 12.1, PCP 2000: 6.8 } 18.9 | 12 | 12.7 | 298 | 80 | 93 |
| 8-4 | BD:0.94 | 1.02 | T-2000: 10, S102-55: 5 } 15 | 11.2 | 13.4 | 320 | 83 | 94 |
| 8-5 | BD:0.94 | 1.02 | T-2000: 10, S102-135: 5 } 15 | 9.6 | 13.3 | 375 | 76 | N.T. |
| 8-6 | CHDM:0.95 | 1.02 | SF6503: 6, S102-55: 12 } 18 | 22.2 | 14.2 | 323 | 102 | 101 |
| 8-7 | BD:0.94 | 1.02 | T-2000: 12, S102-135: 8 } 20 | 14.59 | 11.9 | 264 | 65 | N.T. |

EXAMPLE 9

This Example illustrates the behaviour upon exposure to moisture and to dry heat of a thermoplastic polyurethane prepared in accordance with the invention.

The polyurethane employed in the experiments was obtained using essentially the procedure described in Example 6 but carrying out the reaction on a continuous basis utilizing a Werner-Pfleiderer extruder-mixer, extruding the finished polymer in the form of strands and chopping the latter into pellets. Aliquots of the pellets were then molded under pressure at ca. 425° F. (barrel temperature) using a mold of dimensions (6"×3"×⅛") and employing a Modern Plastics Machinery SKM 75 press. The various specimens so obtained were subjected to various conditions of moisture and heat and the Notched Izod Impact value determined after each exposure was compared with the value determined on the sample immediately prior to the test.

The various reactants employed in preparing the samples and the proportions, by equivalents, are given below.

| | |
|---|---|
| 4,4'-methylenebis(phenyl isocyanate): | 1.02 equivs. |
| 1,4-butanediol: | 0.74 equivs. |
| neopentyl glycol: | 0.25 equivs. |
| T-2000: | 7.5% by weight based on total reactants. |

The results of the various tests are summarized below.

| | | Notched Izod Impact (ft. lbs/in.) | |
|---|---|---|---|
| Treatment | Wt. change % | Before drying | After drying |
| As molded | — | 2.35 | — |
| Boiling water: 24 hr. | +2.26 | 19.5 | 16.4 |
| Humid age at 168° F.: 8 days | +2.1 | 24 | 17 |
| 115° C. Dry air: 16 hr. | −0.1 | 9.3 | — |

EXAMPLE 10

Using exactly the procedure described in Example 6 a thermoplastic polyurethane was prepared from an aromatic diisocyanate which comprised a blend of equal parts by weight of 4,4'-methylenebis(phenyl isocyanate) and a methylenebis(phenyl isocyanate) containing 80 percent by weight of 4,4'-isomer and 20 percent by weight of 2,4'-isomer. The proportions in equivalents and identity of this and the other reactants were as follows.

| | |
|---|---|
| Aromatic diisocyanate: | 1.02 equivalents |
| 1,4-butanediol: | 0.9 equivalents |
| Neopentyl glycol: | 0.1 equivalents |
| Polyol T-2000: | 8.5 percent by weight (based on final product) |

The resulting polyurethane was opaque. Samples were molded as described in Example 6 (the molded samples were also opaque) and found to have the following physical properties.

| | |
|---|---|
| Notched Izod Impact ft. lbs/in.: $\frac{1}{8}$": | 11.5 |
| Flexural strength: psi × 10³: | 14.7 |
| Flexural modulus: psi × 10³: | 366 |
| Heat deflection temperature at 264 psi: | 90° C. |
| Tg: | 96° C. |

EXAMPLE 11

Using the procedure described in Example 6 there was prepared a thermoplastic polyurethane using 4,4'-methylenebis(phenyl isocyanate), SF-6503 and an extender diol which had been prepared in the following manner.

A mixture of 432.63 g. (3 moles) of 1,4-cyclohexanedimethanol, 114.14 g. (1 mole) of ε-caprolactone and 15 ml. of toluene were charged to a reaction vessel and heated to 160° C., with stirring under an atmosphere of argon, and held at that temperature for 45 minutes to remove water by azeotrope using a Dean Stark apparatus. To the resulting mixture was added 0.08 g. (3 drops) of stannous octoate and the temperature was then raised to 190° to 195° C. and held thereat, with stirring, for approximately 6 hours. Examination of aliquots by infrared spectra at intervals during the reaction showed that no ε-caprolactone was still present in the reaction after 2 hours. The resulting mixture was heated at 100° C. under vacuum for 2.5 hours to remove toluene and was then allowed to cool to room temperature. There was thus obtained an adduct having an equivalent weight of 91.1.

The polyurethane was prepared using the following proportions of reactants: 0.975 equivalents of the above adduct, 1 equivalent of the diisocyanate and 6 percent by weight (based on total reactants) of the polyol SF-6503 using exactly the reaction procedure and molding procedure set forth in Example 6. The molded sheet of polyurethane so obtained was opaque in appearance and was found to have a Notched Izod Impact of 19.2 ft lbs/inch ($\frac{1}{8}$').

EXAMPLE 12

Using exactly the procedure and reactant proportions described in Example 6, Run 6-14, but replacing the SF-6503 polyol there used by a number of different polyols there was prepared a series of thermoplastic polyurethanes in accordance with the invention. The various elastomers so obtained were molded into sheets for testing purposes using the molding procedure described in Example 6.

The following TABLE IV shows the polyol used, the amount of polyol used, and the Notched Izod Impact value of the product. The extender was hexane-1,6-diol in all cases and the diisocyanate was 4,4'-methylenebis(phenyl isocyanate) in the proportions shown in Run 6-14. All the products so obtained were opaque in appearance.

TABLE IV

| Run | Polyol | Wt. % | Notched Izod Impact ($\frac{1}{8}$": ft. lbs/in) |
|---|---|---|---|
| 12-1 | [1]Arco R45HT | 9.12 | 2.7 |
| 12-2 | [2]DCQ4-3667 | 10 | 8 |
| 12-3 | [3]Hycar 1300X16 | 6 | 1.2 |
| 12-4 | [4]Hycar 1300X17 | 6 | 2.2 |
| 12-5 | [5]Jeffamine D2000 | 6 | 4.3 |
| 12-6 | [6]Niax 34-28 | 6 | 6.5 |

Footnotes
[1]Hydroxy terminated polybutadiene: Eq. wt = 1370: Arco Chemical
[2]Hydroxy terminated polydimethylsiloxane polyethylene oxide copolymer: Eq. wt = 1200: Dow Corning.
[3]Amine terminated poly(butadiene-acrylonitrile)copolymer: Eq. wt. = 900: B. F. Goodrich.
[4]Hydroxy terminated poly(butadiene-acrylonitrile)copolymer: Eq. wt. = 1700: B. F. Goodrich.
[5]Amino terminated poly(propylene oxide): Eq. wt. = 1000: Texaco Chemical.
[6]Polyoxyethylene-polyoxypropylene glycol: Eq. wt. = 2000: Union Carbide (styrene-acrylonitrile grafted).

We claim:
1. A polyurethane characterized by high impact resistance, high flexural modulus, and a heat deflection temperature of at least 50° C. at 264 psi which comprises the product of reaction of
  (a) an organic polyisocyanate;
  (b) an isocyanate-reactive material having an average functionality of at least 1.9, a glass transition temperature (Tg) of less than 20° C., and a molecular weight in the range of about 500 to about 20,000; and
  (c) at least one chain extender having a functionality from 2 to 3 and a molecular weight from about 50 to about 400;
said polyurethane being further characterized in that the proportion by weight of said isocyanate-reactive material (b) in said polyurethane is from about 2 to about 25 percent and the overall ratio of isocyanate groups to active hydrogen groups in said reactants employed to prepare said polyurethane is in the range of 0.95:1 to about 1.05:1.

2. A polyurethane according to claim 1 wherein the amount of said component (b) is within the range of about 4 to about 15 percent by weight based on the weight of said polyurethane.

3. A polyurethane according to claim 1 or 2 wherein the component (b) comprises a polyether polyol.

4. A polyurethane according to claim 3 wherein the polyether polyol comprises a polyoxypropylene polyoxyethylene triol having a primary hydroxyl content of at least about 80 percent and a molecular weight in the range of about 2000 to about 20,000.

5. A polyurethane according to claim 3 wherein the polyether polyol comprises a polytetramethylene glycol.

6. A polyurethane according to claim 1 or 2 wherein the component (b) comprises a polyester polyol.

7. A polyurethane according to claim 1 or 2 wherein the component (b) comprises a mixture of a polyether polyol and a polyester polyol.

8. A polyurethane according to claim 1 wherein the organic polyisocyanate is 4,4'-methylenebis(phenyl isocyanate).

9. A polyurethane according to claim 8 wherein said 4,4'-methylenebis(phenyl isocyanate) is employed in admixture with the corresponding 2,4'-isomer in an amount up to about 70 percent by weight based on total diisocyanate mixture.

10. A polyurethane according to claim 8 wherein said 4,4'-methylenebis(phenyl isocyanate) has been treated previously to convert a minor proportion thereof to the corresponding carbodiimide thereby to form a diisocyanate which is a stable liquid at ambient temperature.

11. A polyurethane according to claim 8 wherein said 4,4'-methylenebis(phenyl isocyanate) has been reacted previously with a minor amount of at least one aliphatic diol thereby to form a diisocyanate which is a stable liquid at ambient temperature.

12. A polyurethane according to claim 8 wherein said 4,4'-methylenebis(phenyl isocyanate) is employed in admixture with a minor amount of polymethylene polyphenyl polyisocyanate.

13. A polyurethane according to claim 1 wherein said chain extender comprises an aliphatic diol.

14. A polyurethane according to claim 13 wherein said aliphatic diol is 1,6-hexanediol.

15. A polyurethane according to claim 13 wherein said aliphatic diol is 1,4-butanediol.

16. A polyurethane according to claim 13 wherein said aliphatic diol is a mixture of 1,4-butanediol and neopentyl glycol.

17. A polyurethane according to claim 13 wherein said aliphatic diol is 1,4-cyclohexanedimethanol.

18. A polyurethane according to claim 13 wherein said aliphatic diol is a mixture of 1,4-cyclohexanedimethanol and 1,6-hexanediol.

19. A polyurethane according to claim 1 wherein said extender is the product obtained by reacting an aliphatic diol with a member selected from the class consisting of (a) caprolactone in the mole ratio of from about 0.01 to about 2 moles of caprolactone per mole of aliphatic diol and (b) adipic acid in the mole ratio of from about 0.01 to about 0.8 mole of acid per mole of aliphatic diol.

20. A thermoplastic polyurethane characterized by high impact resistance, high flexural modulus, and a heat deflection temperature of at least 50° C. at 264 psi which comprises the product of reaction of:

(a) an organic diisocyanate;

(b) an isocyanate-reactive material having an average functionality of at least 1.9, a glass transition temperature (Tg) of less than 20° C., and a molecular weight in the range of about 500 to about 20,000; and (c) at least one chain extender diol having a molecular weight from about 50 to about 400;

said polyurethane being further characterized in that the proportion by weight of said component (b) in said polyurethane is from about 2 to about 25 percent and the overall ratio of isocyanate groups to active hydrogen groups in said reactants employed to prepare said polyurethane is in the range of about 0.95:1 to about 1.05:1.

21. A thermoplastic polyurethane according to claim 20 wherein the organic diisocyanate comprises 4,4'-methylenebis(phenyl isocyanate).

22. A thermoplastic polyurethane according to claim 21 wherein the 4,4'-methylenebis(phenyl isocyanate) is employed in admixture with a minor amount of the corresponding 2,4'-isomer.

23. A thermoplastic polyurethane according to claim 21 wherein said 4,4'-methylenebis(phenyl isocyanate) has been previously reacted with a minor amount of at least one aliphatic diol thereby to form a diisocyanate which is a stable liquid at ambient temperature.

24. A thermoplastic polyurethane according to claim 21 wherein said 4,4'-methylenebis(phenyl isocyanate) is employed in admixture with a minor amount of a 4,4'-methylenebis(phenyl isocyanate) which has previously been treated to convert a minor proportion thereof to the corresponding carbodiimide thereby to form a product which is a stable liquid at ambient temperature.

25. A thermoplastic polyurethane according to claim 20 or 21 wherein said chain extender diol is selected from the class consisting of 1,4-butanediol, neopentyl, glycol, 1,6-hexanediol, 1,4-cyclohexanedimethanol, the product obtained by reacting 1,4-cyclohexanedimethanol with caprolactone in the mole ratio of from about 0.01 to about 2 moles of caprolactone per mole of 1,4-cyclohexanedimethanol, and the product obtained by reacting adipic acid and 1,4-cyclohexanedimethanol in the mole ratio of from about 0.01 to about 0.8 mole of acid per mole of 1,4-cyclohexanedimethanol, and mixtures of two or more of said diols.

26. A thermoplastic polyurethane according to claim 20 or 21 wherein said component (b) comprises a polyether polyol.

27. A thermoplastic polyurethane according to claim 26 wherein the polyether polyol comprises a polyoxypropylene polyoxyethylene triol having a primary hydroxyl content of at least about 80 percent and a molecular weight in the range of about 2000 to about 20,000.

28. A thermoplastic polyurethane according to claim 26 wherein the polyether polyol comprises a polytetramethylene glycol.

29. A thermoplastic polyurethane according to claim 20 wherein the component (b) comprises a polyester polyol.

30. A thermoplastic polyurethane according to claim 20 wherein the component (b) comprises a mixture of a polyether polyol and polyester polyol.

31. A thermoplastic polyurethane characterized by high impact resistance, high flexural modulus, and a heat deflection temperature of at least 50° C. at 264 psi which comprises the product of reaction of:
- (a) 4,4'-methylenebis(phenyl isocyanate);
- (b) a polyether polyol having an average functionality of at least 1.9 and a molecular weight in the range of about 500 to about 20,000; and
- (c) at least one aliphatic diol chain extender having a molecular weight from about 50 to about 400;

said polyurethane being further characterized in that the proportion by weight of said polyether polyol in said polyurethane is from about 4 to about 15 percent by weight based on said polyurethane.

32. A thermoplastic polyurethane according to claim 31 wherein said polyether polyol is a polyoxypropylene polyoxyethylene triol having a primary hydroxyl content of at least about 80 percent and a molecular weight in the range of about 2000 to about 20,000.

33. A thermoplastic polyurethane according to claim 31 wherein said polyether polyol is a polytetramethylene glycol.

34. A thermoplastic polyurethane according to claims 31, 32 or 33 wherein said chain extender is selected from the class consisting of 1,4-butanediol, neopentyl glycol, 1,6-hexanediol, 1,4-cyclohexanedimethanol, the product obtained by reacting 1,4-cyclohexanedimethanol with caprolactone in the mole ratio of from about 0.01 to about 2 moles of caprolactone per mole of 1,4-cyclohexanedimethanol, and the product obtained by reacting adipic acid and 1,4-cyclohexanedimethanol in the mole ratio of from about 0.01 to about 0.8 mole of acid per mole of 1,4-cyclohexanedimethanol, and mixtures of two or more of said diols.

35. A thermoplastic polyurethane according to claim 31 wherein the 4,4'-methylenebis(phenyl isocyanate) is employed in admixture with a minor amount of the corresponding 2,4'-isomer.

36. A thermoplastic polyurethane according to claim 31 wherein the 4,4'-methylenebis(phenyl isocyanate) has been reacted previously with a minor amount of at least one aliphatic diol thereby to form a diisocyanate which is a stable liquid at ambient temperature.

37. A thermoplastic polyurethane according to claim 31 wherein said 4,4'-methylenebis(phenyl isocyanate) is employed in admixture with a minor amount of a 4,4'-methylenebis(phenyl isocyanate) which has been treated previously to convert a minor proportion thereof to the corresponding carbodiimide thereby to form a product which is a stable liquid at ambient temperature.

* * * * *

UNITED STATES PATENT OFFICE
CERTIFICATE OF CORRECTION

Patent No. 4,376,834          Dated March 15, 1983

Inventor(s) David J. Goldwasser and Kemal Onder

It is certified that error appears in the above-identified patent and that said Letters Patent are hereby corrected as shown below:

In column 13, lines 33-35 the heading and first line of the Table should read:

| Polyisocyanate | $A^1$ | $B^2$ | $C^3$ | $D^4$ |
|---|---|---|---|---|
| % w/w Polyether triol | 16.2 | 16.2 | 16.2 | 16.9 |

Column 15, Table I Run No. "6.7" should read -- 6-7 --.
Column 20, line 16 "(1/8')" should read --(1/8")--.

Signed and Sealed this

Fifth Day of July 1983

[SEAL]

Attest:

Attesting Officer

GERALD J. MOSSINGHOFF

Commissioner of Patents and Trademarks